(12) United States Patent
Bischoff et al.

(10) Patent No.: US 7,123,831 B2
(45) Date of Patent: Oct. 17, 2006

(54) DEVICE AND METHOD FOR RESTORING CONNECTIONS IN AUTOMATICALLY SWITCHABLE OPTICAL NETWORKS

(75) Inventors: Mathias Bischoff, Munich (DE); Joachim Charzinski, Oberschleissheim (DE); Dominic Axel Schupke, Munich (DE); Bernd Stilling, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 901 days.

(21) Appl. No.: 10/036,401

(22) Filed: Jan. 7, 2002

(65) Prior Publication Data

US 2002/0163686 A1 Nov. 7, 2002

Related U.S. Application Data

(60) Provisional application No. 60/260,037, filed on Jan. 5, 2001.

(30) Foreign Application Priority Data

Aug. 30, 2001 (DE) ................ 101 42 372

(51) Int. Cl.
*G02F 1/00* (2006.01)
*G02F 2/00* (2006.01)
*H01S 3/00* (2006.01)
*H04B 10/00* (2006.01)
*H04J 14/00* (2006.01)

(52) U.S. Cl. ............. 398/5; 398/2; 398/57; 370/217; 370/221

(58) Field of Classification Search ............ 398/2, 398/5, 7, 8, 57
See application file for complete search history.

(56) References Cited

U.S. PATENT DOCUMENTS

| 5,590,118 | A | * | 12/1996 | Nederlof | 370/218 |
| 5,812,524 | A | * | 9/1998 | Moran et al. | 370/228 |
| 5,838,660 | A | * | 11/1998 | Croslin | 370/216 |
| 2002/0021466 | A1 | * | 2/2002 | Abrams | 359/128 |

OTHER PUBLICATIONS ("Approximate Analysis of Time-Synchronous Packet Networks"; Viterbi, A.; Selected Areas in Communications, IEEE Journal on; vol. 4, Issue 6, Sep. 1986, pp. 878-890.*

* cited by examiner

*Primary Examiner*—Jason Chan
*Assistant Examiner*—Nathan Curs
(74) *Attorney, Agent, or Firm*—Young & Thompson

(57) ABSTRACT

An optical communication network, an optical information transmission method and network node devices for use in an optical communication network, in which optical signals are exchanged via a first data link between a first network node device and a second network node device with interposition of a number of further interconnected network node devices, in which, after a disturbance on the first data link, a third network node device sends a signaling signal to a fourth network node device connected to the third network node device for setting up a second data link which acts at least partially as a standby for the first data link, which signaling signal contains a parameter (NRR, n) determined by the third network node device on the basis of which it is determined whether the fourth network node device is responsible for setting up the second data link or not.

12 Claims, 4 Drawing Sheets

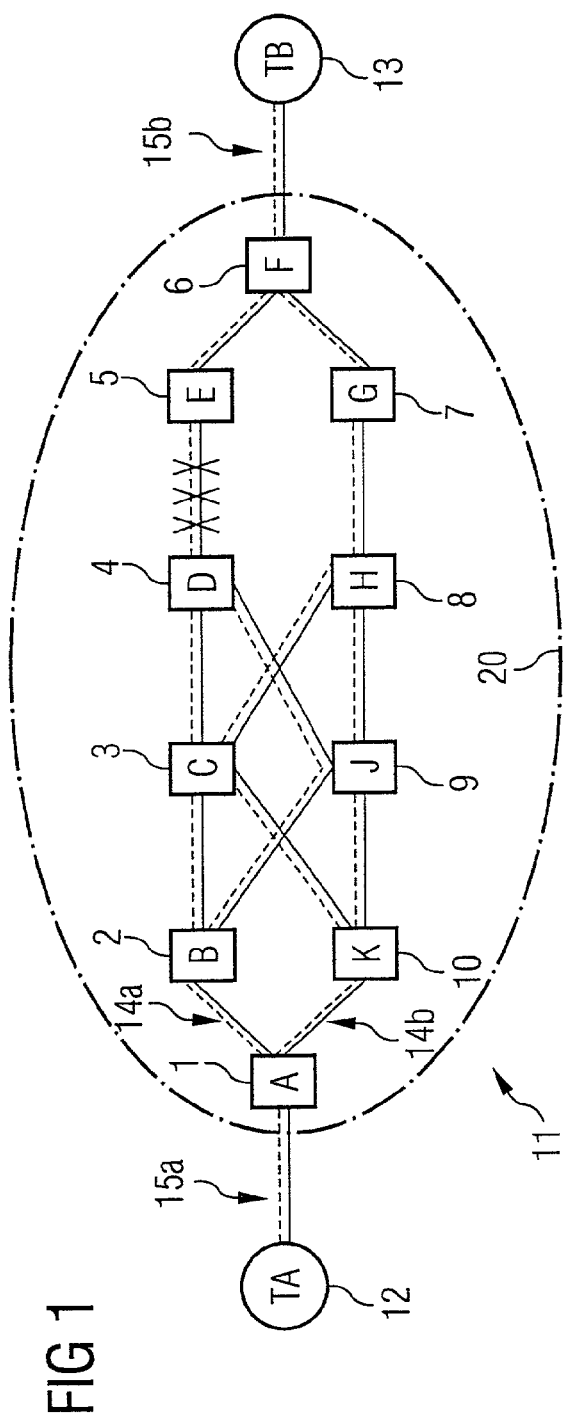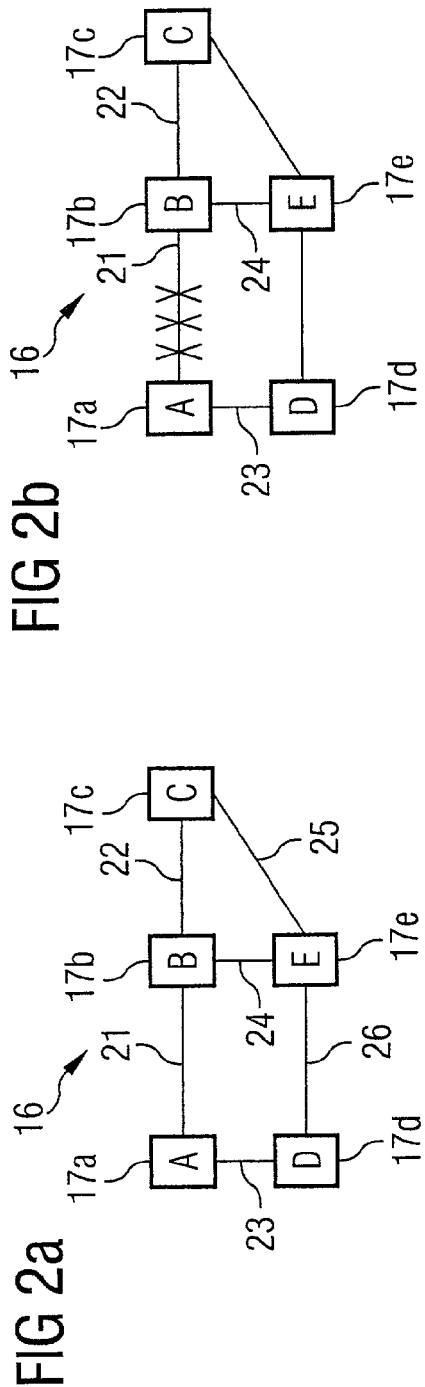

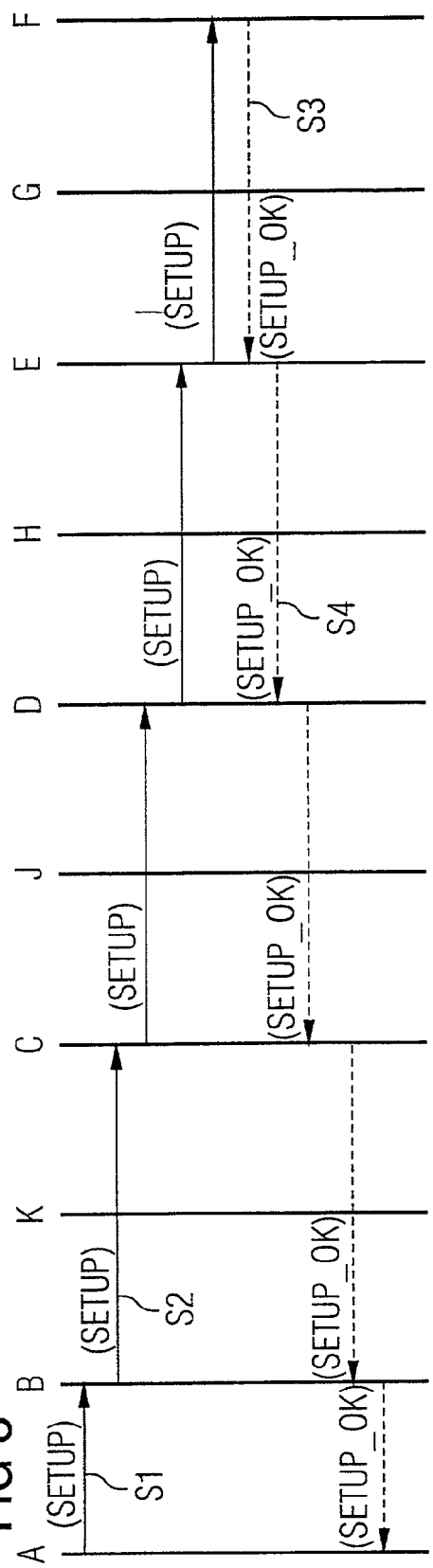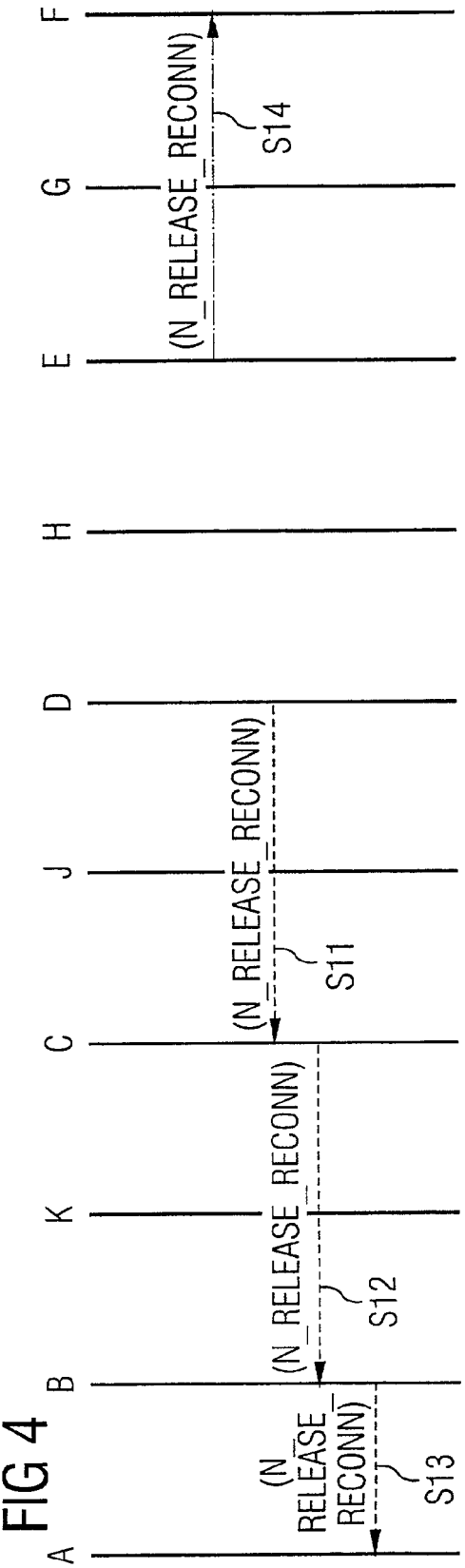

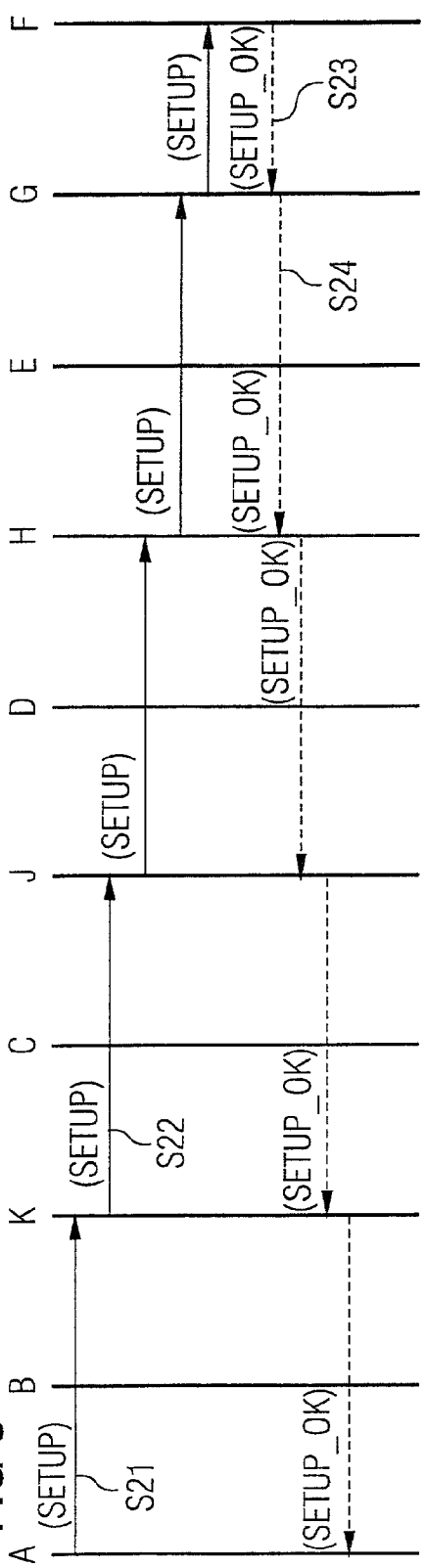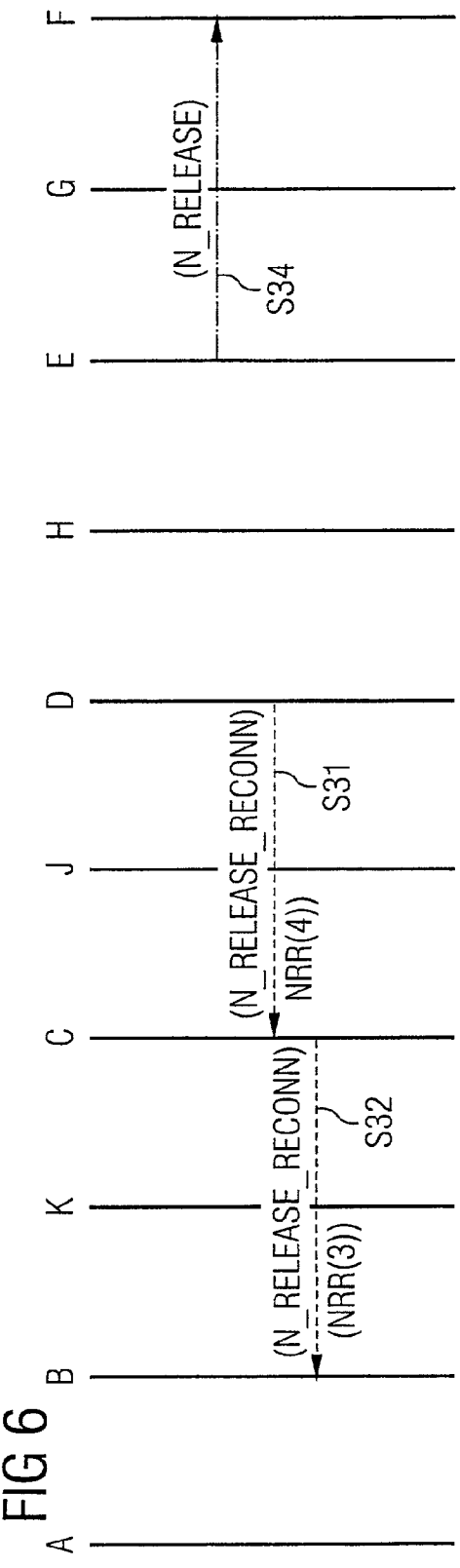

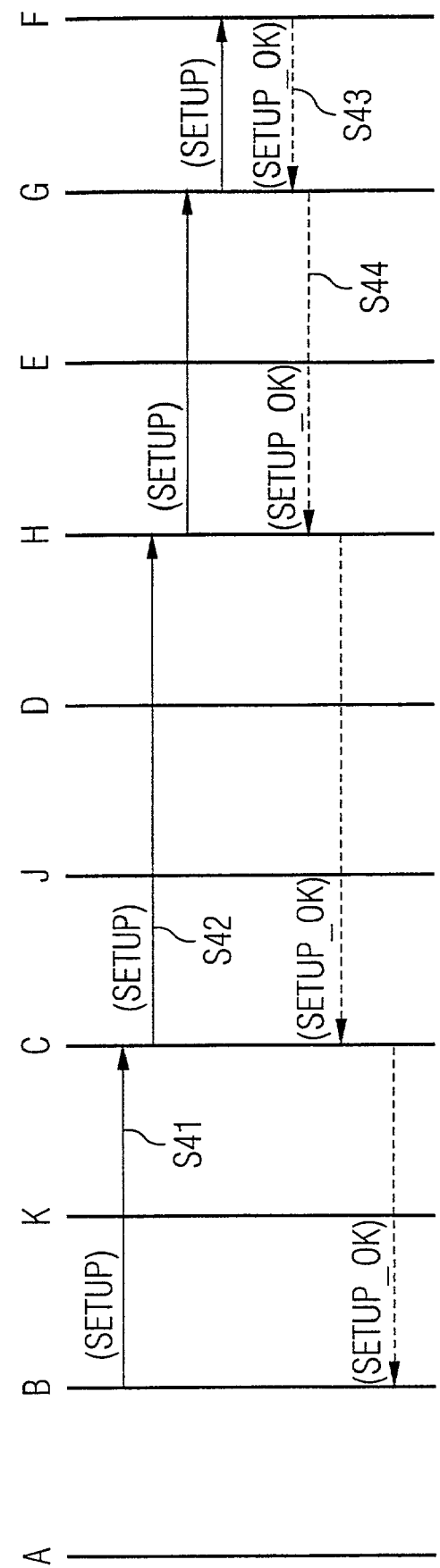

DEVICE AND METHOD FOR RESTORING CONNECTIONS IN AUTOMATICALLY SWITCHABLE OPTICAL NETWORKS

BACKGROUND OF THE INVENTION

The invention relates to an optical communication network, network node devices for use in such an optical communication network and an optical information transmission method.

DESCRIPTION OF THE RELATED ART

Optical communication networks generally exhibit a first transceiver device from which optical signals are transmitted via a data link to a second transceiver device with the interposition of a number of interconnected network node devices. The network node devices can be connected to one another in each case, e.g. via one or more optical waveguides.

Within the communication network, data are transmitted, for example, with the aid of optical binary WDM (wavelength division multiplex) signals. In this arrangement, a number of wavelength-division-multiplexed pulsed optical signals can be transmitted via a single optical waveguide.

In the optical communication networks currently in operation, the data link is not set up locally from the individual network node devices but from a central control device or a central network management.

Apart from the actual "working" data link, a "standby" data link is also set up in parallel, independently of the state of the former. When disturbances (or excessive disturbances) occur on the "working" data link, the data transmission is then rapidly switched from the "working" to the "standby" data link (protection switching).

In so-called ASON (automatically switched optical network) networks, in contrast to the optical communication networks currently being operated, the respective data links are set up by the network node devices themselves instead of by the above-mentioned central control device. For this purpose, corresponding signaling signals are exchanged between the individual network node devices.

The signaling signals can be sent out e.g. via corresponding signaling channels; the actual user data are then transmitted via separate user data channels.

SUMMARY OF THE INVENTION

The invention has the object of providing a novel optical communication network, novel network node devices for use in an optical communication network and a novel optical information transmission method.

According to a basic concept of the invention, an optical communication network is provided in which optical signals are exchanged via a first data link between a first network node device and a second network node device with interposition of a number of further interconnected network node devices, in which, after a disturbance on the first data link, a third network node device sends a signaling signal to a fourth network node device connected to the third network node device for setting up a second data link which acts at least partially as a standby for the first data link, which signaling signal contains a parameter determined by the third network node device on the basis of which it is determined whether the fourth network node device is responsible for setting up the second data link or not.

The parameter preferably contains information with respect to the distance between the third network node device and a further, e.g. the second (or alternatively the first), network node device.

For example the fourth network node device can then be responsible for setting up the second data link if the distance between the fourth and the second network node device, determined by the fourth network node device, is not less than the distance, corrected by the distance between the fourth and third network node device, between the third and second network node device.

By this means it is possible to achieve the scenario, e.g., that the second data link (i.e. the standby data link) is set up by a network node device (e.g. the fourth network node device) which is relatively close to the location of the disturbance.

The standby data link can thus be set up more rapidly than in the prior art. In the prior art, the responsibility for setting up the standby data link is forwarded to the network node device which was responsible for setting up the first data link (i.e. for example to the abovementioned first network node device).

BRIEF DESCRIPTION OF THE DRAWINGS

In the text which follows, the invention will be explained in greater detail with reference to a number of exemplary embodiments and the attached drawing, in which:

FIG. 1 shows a diagrammatic representation of an optical communication network according to a first exemplary embodiment of the present invention;

FIG. 2a shows a diagrammatic representation of the structure of a simple data network for explaining the principle of the "link state" protocol;

FIG. 2b shows a diagrammatic representation of the structure of the data network shown in FIG. 2a after a disturbance has occurred;

FIG. 3 shows a diagrammatic representation of the time sequence of signaling signals exchanged between the network node devices shown in FIG. 1 for setting up a data link;

FIG. 4 shows a diagrammatic representation of the time sequence of signaling signals exchanged between the network node devices shown in FIG. 1 in conventional methods for releasing a data link;

FIG. 5 shows a diagrammatic representation of the time sequence of signaling signals exchanged between the network node devices shown in FIG. 1 in conventional methods for restoring a data link;

FIG. 6 shows a diagrammatic representation of the time sequence of signaling signals exchanged between the network node devices shown in FIG. 1 according to an advantageous data link releasing/restoring method for releasing a data link; and FIG. 7 shows a diagrammatic representation of the time sequence of signaling signals exchanged between the network node devices shown in FIG. 1 according to an advantageous data link releasing/restoring method for restoring a data link.

DESCRIPTION OF THE PREFERRED EMBODIMENTS

FIG. 1 shows an optical communication network 11 (in this case an ASON (automatically switched optical network) network) according to a first exemplary embodiment of the present invention. This exhibits a multiplicity of network node devices 1, 2, 3, 4, 5, 6, 7, 8, 9, 10 connected to one another via an optical waveguide network 20 (illustrated by a dot-dashed line in the representation according to FIG. 1), and a multiplicity of subscriber line or client devices 12, 13. These can be, for example, further SDH (synchronous digital hierarchy), ATM (asynchronous transfer mode) or IP (internet protocol) client devices connected at the client end, for example IP routers.

Within the optical waveguide network 20, each network node device 1, 2, 3, 4, 5, 6, 7, 8, 9, 10 is connected via in each case one or more optical waveguide bundles or via one or more individual optical waveguides to in each case one or more (e.g. two, three, or four) further network node devices 1, 2, 3, 4, 5, 6, 7, 8, 9, 10. The client devices 12, 13 are correspondingly connected via one (or more) optical waveguides 15a, 15b to in each case one particular (or alternatively to a number of) network node devices 1, 6.

To transmit data within the optical waveguide network 20 or the optical communication network 11, respectively, a WDM (wavelength division multiplex) data transmission method can be used, for example. Due to the wavelength division multiplex, a number of different pulsed optical binary signals can be simultaneously transmitted via each optical waveguide existing in the network by utilizing in each case different wavelength bands.

Between the respective client device 12, 13 and the network node device 1, 6 in each case connected to it and between the different network node devices 1, 2, 3, 4, 5, 6, 7, 8, 9, 10, a first optical waveguide channel is in each case used for transmitting user signals (illustrated by continuous lines in the representation of FIG. 1), and in each case a second optical waveguide channel is used for transmitting signaling signals (explained in greater detail in the text which follows and illustrated by dashed lines in the representation according to FIG. 1).

In the user signals, the actual user data are coded and in the signaling signals the signaling information is coded (see below). In the present exemplary embodiment, the actual user data and the signaling information are in each case transmitted via different channels of one and the same optical waveguide (e.g. user and signaling channels separated from one another by means of wavelength division and/or time division multiplex). In alternative exemplary embodiments, by contrast, the signaling information and the user data are in each case transmitted via separate optical waveguides and/or via separate paths. A transmission of the signaling information via a separate network, e.g. an electrical transmission network is also conceivable. Similarly, the exchange of signaling information can also take place, instead of between the network node devices affected as shown, between the respective network node devices affected in each case and one or more central network node devices in which the signaling information is processed.

In the present exemplary embodiment, a "link state" protocol is used for exchanging data with respect to the current network state in each case between the network node devices 1, 2, 3, 4, 5, 6, 7, 8, 9, 10.

"Link state" protocols are based on a "local map". Each network node device 1, 2, 3, 4, 5, 6, 7, 8, 9, 10 exhibits a storage device (not shown) in which a data record is stored which represents the complete (topological) map or structure of the optical waveguide network 20. The corresponding data records are regularly updated.

In the text which follows, the principle of "link state" protocols is explained by means of the simple data network 16 shown in FIGS. 2a and 2b. It exhibits five network nodes 17a, 17b, 17c, 17d, 17e which are connected to one another via internodal links 21, 22, 23, 24, 25.

According to table 1, for example, the structure of the data network 16 can be represented by the following data record stored in all network nodes 17a, 17b, 17c, 17d, 17e:

TABLE 1

| Q<br>Link from: | R<br>Link to: | S<br>Link: | T<br>State: |
|---|---|---|---|
| A | B | 21 | 1 |
| A | D | 23 | 1 |
| B | A | 21 | 1 |
| B | C | 22 | 1 |
| B | E | 24 | 1 |
| C | B | 22 | 1 |
| C | E | 25 | 1 |
| D | A | 23 | 1 |
| D | E | 26 | 1 |
| B | B | 24 | 1 |
| F | C | 25 | 1 |
| E | D | 26 | 1 |

In this table, the first variable Q ("link from:") is the identifier of the network node from which the respective internodal link originates, the second variable R ("link to:") is the identifier of the network node to which the respective internodal link leads and the third variable S ("link") is the identifier of the respective internodal link. The fourth variable T ("state") identifies the state of the respective internodal link (the distance or "metric").

A working internodal link can be identified, for example, with the aid of a state variable T having the value "1" (compare fourth column of the above table). If an internodal link is broken, the state variable T is correspondingly adapted (e.g. from the value "1" to the value "∞").

Since each node 17a, 17b, 17c, 17d, 17e knows the complete network topology, each node can itself calculate the best path in each case to any other node 17a, 17b, 17c, 17d, 17e. Because the same data record is stored in all nodes 17a, 17b, 17c, 17d, 17e, the paths are unambiguous so that no loops are formed.

FIG. 2b shows a diagrammatic representation of the structure of the data network 16 shown in FIG. 2a after a change in the network topology, in this case a break in the internodal link 21 between node 17a (node A) and node 17b (node B). The change in state of the corresponding internodal link 21 is detected by node 17a (node A) and by node 17b (node B). The nodes 17a (node A) and node 17b (node B) then update the data record stored there and transmit the updated data record to the remaining network nodes 17a, 17b, 17c, 17d, 17e. A so-called "flooding" protocol is used for this purpose.

Again referring to FIG. 1, a (connection setup request) signaling signal is first sent from the client device 12 via the optical waveguide 15a (or the abovementioned signaling channel) to the first network node device 1 by means of corresponding optical binary pulses for setting up a data link between the first client device 12 and the second client device 13. This signal contains, among other things, an identifier identifying the destination client device 13 or, respectively, the destination network node device 6 connected to it (or its optical network address).

As already mentioned, each network node device 1, 2, 3, 4, 5, 6, 7, 8, 9, 10 exhibits a storage device with a database in which a data record corresponding to the data record shown in table 1 is stored which represents the complete (topological) map or structure of the optical waveguide network 20.

After receiving the (connection setup request) signaling signal, a control device (not shown) of the network node device 1 determines from the data record and the received destination network node identifier the optimum or shortest path to the destination network node device 6 (or, respectively, to the destination client device 13 connected to it). For this purpose, the Bellman-Ford algorithm can be used, for example, or the "shortest path first (SPF)" algorithm according to E. W. Dijstra, for example.

Following this, a (connection setup request) signaling signal S1 (SETUP) is sent, according to FIG. 3, from the network node device 1 to the next network node device contained in the optimum path determined (in this case the network node device 2) via the optical waveguide bundles 14a (or the corresponding signaling channel) by means of corresponding optical binary pulses. This contains, e.g., the identifier identifying the destination network node device 6 connected to the destination client device 13 (or its optical network address, respectively).

In a corresponding manner to the above, a control device (not shown) of the network node device 2 determines, after receiving the (connection setup request) signaling signal S1, the optimum path to the destination network node device 6 from the network topology data record stored in its storage device and from the received destination network node identifier.

As is also shown in FIG. 3, a further (connection setup request) signaling signal S2 (SETUP) corresponding to the signaling signal S1 is then sent from the network node device 2 to the next network node device contained in the optimum path determined (in this case network node device 3) via the corresponding optical waveguide bundle, etc.

In this manner, a data link between the first network node device 1 and the destination network node device 6 (or the corresponding client devices 12, 13, respectively), conducted via the path A-C-D-E-F is progressively set up.

The successful setting-up of the data link is then reported by means of a (connection setup acknowledgement) signaling signal S3 (SETUP_OK) from the destination network node device 6 to the network node device (in this case network node device 5) preceding network node device 6 in the optimum path determined.

This preceding network node device sends a further (connection setup acknowledgement) signaling signal S4 (SETUP_OK) corresponding to the signaling signal S3 to the network node device (in this case network node device 4) preceding it in the optimum path, etc.

In this manner, the successful connection setup is progressively reported to the individual network node devices contained in the optimum path (and thus also to network node device 1 initiating the connection setup).

If there is a change in the topology of the optical waveguide network 20 (e.g. in the case of a disturbance or break in the link between the network node devices 4, 5—illustrated with the aid of three crosses X X X in the drawing), this change is detected by the network node devices affected in each case (in this case network node devices 4, 5).

The control devices of the respective network node devices 4, 5 then in each case update the data records stored there (e.g. by changing the value of the state variable identifying the state of the link between the network node devices 4, 5 from "1" to "∞").

Next, the updated data record is transmitted by means of corresponding signaling signals transmitted via the above-mentioned signaling channels in accordance with the above-mentioned "flooding" protocol to the remaining network node devices and stored in their storage devices.

As shown in FIG. 4, corresponding (connection release) signaling signals (N_RELEASE and N_RELEASE_R-ECONN) are then sent out next by the network node devices 4, 5 affected in conventional methods. This is done along the original optimum path (D-C-B-A or, respectively, E-F).

The (connection release) signaling signal S14 (N_RELEASE) sent out to the destination network node device 6 by the network node device 5 also tells the destination network node device 6 that there is no responsibility for restoring the link. In contrast, the (connection release) signaling signal S11 (N_RELEASE_RECONN) sent out by the network node device 4 to the network node device 3 contains the information that the originating network node device 1 is to initiate the restoration of the data link. As a response to the (connection release) signaling signal S1, the network node device 3 sends to the network node device 2 a (connection release) signaling signal S12 (N_RELEASE_RECONN) corresponding to the signaling signal S11. This network node device 2 sends a further (connection release) signaling signal S13 (N_RELEASE_RECONN) corresponding to the above signals S11 and S12 to the network node device 1 initiating the original link.

The originating network node device 1 or, respectively, its control device, derives from the received signal S13 the information that a new data link to the destination network node device is to be set up from the originating network node device 1.

After receiving the (connection release) signaling signal S13, the control device of the network node device 1 determines from the altered data record stored in its control device the optimum standby path to the destination network node device 6 (in this case path A-K-J-H-G-F).

Following this, a (connection setup request) signaling signal S21 (SETUP), corresponding to the signal S1 shown in fiure 3, is sent according to FIG. 5 from the network node device 1 to the next network node device contained in the standby path determined (in this case network node device 10) via the optical waveguide bundle 14b. In a corresponding manner to what has been shown above with respect to FIG. 3, a further (connection setup request) signaling signal S22 is then sent from the network node device 10 to the next network node device contained in the standby path determined (in this case network node device 9), etc.

In this manner, a data link conducted via the standby path A-K-J-H-G-F is progressively set up between the first network node device 1 and the destination network node device 6 (or the corresponding client devices 12, 13).

The successful setting-up of the data link is then reported by means of a (connection setup acknowledgement) signaling signal S23 (SETUP_OK) from the destination network node device 6 to the network node device (in this case network node device 7) preceding network node device 6 in the standby path determined, and from there progressively via further (connection setup acknowledgement) signaling signals S24 to the other network node devices 8, 9, 10, 1 contained in the standby path.

Instead of the method explained by means of FIGS. 4 and 5, the following data link restoration method explained by means of FIGS. 6 and 7 is particularly advantageously used in accordance with the invention:

After a change has occurred in the topology of the optical waveguide network 20 (e.g. in the case of a disturbance or break in the link between the network node devices 4, 5—illustrated by the three crosses X X X in FIG. 1), the respective change is first of all correspondingly noted, as described above, in the data record of the network node device 4, 5 affected in each case (for example by changing the value of the state variable identifying the state of the link between the network node devices 4, 5 from "1" to "∞").

Following this, the updated data record is transmitted by means of corresponding signaling signals transmitted via the abovementioned signaling channels to the remaining network node devices and stored in their storage devices.

Next, as shown in FIG. 6, corresponding (connection release) signaling signals (N_RELEASE and, respectively, N_RELEASE_RECONN) are sent out by the network node devices 4, 5 affected, along the original optimum path.

The (connection release) signaling signal S34 (N_RELEASE) sent out by the network node device 5 to the destination network node device 6 tells the destination network node device 6 that there is no responsibility for restoring the link.

In contrast, the (connection release) signaling signal S31 (N_RELEASE_RECONN) sent out by the network node device 4 to the network node device 3 contains the instruction (linked to certain conditions explained below) to ensure a restoration of a data link.

In contrast to the procedure explained in conjunction with FIGS. 4 and 5, the restoration is not carried out from a predetermined network node device (e.g. from the originating network node device 1).

Instead, a network node device is given responsibility for a restoration of a data link if it
i) can determine a standby path to the destination network node device; and
ii) the distance metric to the destination network node device has not diminished any further compared with the preceding network node device (additionally taking into consideration the distance between the network node device affected in each case and the preceding network node device).

If the above conditions i) and ii) apply to none of the network node devices affected in each case, the originating network node device 1 is responsible for restoring the data link, corresponding to the situation in FIGS. 4 and 5.

So that the network node device 3 receiving the (connection release) signaling signal S21 according to FIG. 6 can check in accordance with the above procedure whether it is responsible for the restoration of the link or not (checking the above conditions i) and ii)), the (connection release) signaling signal S31 contains information with respect to the distance between the network node device 4 sending out the (connection release) signaling signal S31 and the destination network node device 6 (signal NRR(4)). This distance is determined by the control device of the network node device 4 by means of the above (updated) data record. In the present case, the distance or the metric between the network node device 4 and the destination network node device 6 has the value "4" since a potential, working shortest path would lead via the four network node devices 9, 8, 7, 6.

After the (connection release) signaling signal S31 has been received by the network node device 3, its control device determines the distance between the network node device 3 and the destination network node device 6 by means of the (updated) data record stored in the network node storage device. In the present case, the distance between the network node device 3 and the destination network node device 6 has the value "3" since a potential, working shortest path between the two network node devices 3, 6 would lead via the three network node devices 8, 7, 6. The distance value determined (in this case "3") is reduced by the value of the distance between the network node device 3 and the network node device 4 from which the network node device 3 has received the (connection release) signaling signal S31, i.e. in this case by the value "1". The adapted distance value thus obtained (in this case "2") is compared with the distance value (in this case "4") transmitted from the network node device 4 via the (connection release) signaling signal S31.

If the compared distance values are of equal magnitude or if the adapted distance value determined by network node device 3 is greater than the distance value transmitted by network node device 4, network node device 3 is responsible for restoring the data link.

If, as in this case, the adapted distance value determined by the network node device 3 is smaller than the distance value transmitted by the network node device 4, network node device 3 does not have responsibility for restoring the data link.

Network node device 3 then sends to network node device 2 a (connection release) signaling signal S32 (N_RELEASE_RECONN) corresponding to the signaling signal S31. This contains information with respect to the distance, determined in the above manner, between the network node device 3 sending out the (connection release) signaling signal S32 and the destination network node device 6 (signal NRR(3)).

After the network node device 2 has received the (connection release) signaling signal S32, its control device determines the distance between network node device 2 and the destination network node device 6 by means of the (updated) data record stored in the network node storage device. In the present case, the distance between network node device 2 and the destination network node device 6 has the value "4" since a potential, working shortest path between the two network node devices 2, 6 would lead via the four network node devices 3, 8, 7, 6. The distance value determined (in this case "4") is diminished by the value of the distance between network node device 2 and network node device 3 from which network node device 2 has received the (connection release) signaling signal S32, i.e. by the value "1" in this case. The adapted distance value (in this case "3") thus obtained is compared with the distance value (in this case "3") transmitted by network node device 3 via the (connection release) signaling signal S31.

If the adapted distance value determined by the network node device 2 is smaller than the distance value transmitted by the network node device 3, network node device 2 does not have responsibility for restoring the data link.

If, in contrast, the compared distance values are of equal magnitude as in this case (or if the adapted distance value determined by the network node device 2 is greater than the distance value transmitted by network node device 3), network node device 2 is responsible for restoring the data link.

Following this and in accordance with FIG. 7, a (connection setup request) signaling signal S41 (SETUP) corresponding to the signal S1 shown in FIG. 3 is sent from the network node device 2 to the next network node device (in this case network node device 3) contained in the (standby) path (in this case path B-C-H-G-F) determined by the control device of the network node device 2 via the corresponding optical waveguide bundle to set up a standby data link.

In a corresponding manner as shown above with respect to FIG. 3, a further (connection setup request) signaling signal S42 is then sent by the network node device 3 to the next network node device (in this case network node device 8) contained in the standby path determined, etc.

In this manner, a data link conducted via the standby path A-B-C-H-G-F is progressively set up between the first network node device 1 and the destination network node device 6 (or, respectively, the corresponding client devices 12, 13).

The successful setting-up of the data link is then reported, according to FIG. 7, by means of a (connection setup acknowledgement) signaling signal S43 (SETUP_OK) from the destination network node device 6 to the network node device (in this case network node device 7) preceding the network node device 6 in the standby path determined, and from there progressively to the other network node devices 8, 3, 2 contained in the standby path via further (connection setup acknowledgement) signaling signals S44.

As a result, a standby data link is set up in a relatively quick way starting from a network node device 2 located relatively close to the location of the disturbance or break in the original data link, which avoids unnecessary dual paths.

In alternative exemplary embodiments not shown here, signaling signals (N_RELEASE and, respectively, N_RELEASE_RECONN), corresponding to the above-mentioned (connection release) signaling signals S31, S32, S34, are sent out by the network node devices 4, 5 affected by a disturbance of the data link, along the original optimum path; however, the responsibility for restoring the link is not allocated to those network node devices 3, 2, 1 which are located on the original path between the network node device 4 and the originating network node device 1 but to those network node devices 6 which are located on the original path between network node device 5 and destination network node device 6.

In this arrangement, the network node device 3 is told by means of a (connection release) signaling signal (N_RELEASE) sent out by the network node device 4 to the network node device 3 that there is no responsibility for restoring the link.

In contrast, a (connection release) signaling signal (N_RELEASE_RECONN) sent by the network node device 5 to network node device 6 contains the instruction (linked to certain conditions corresponding to the abovementioned conditions) to ensure a restoration of the data link.

As an alternative, the responsibility for the reconnection can also be established in accordance with another, globally unambiguous metric (for example, the responsibility for the reconnection can be handed on in the direction of the network node device having the numerically greater or smaller network address).

As an alternative, the decision regarding from which side of the failed link the data link is to be restored can be made, e.g., on the basis of the distance between the point of failure and the respective network node end devices of the (broken) data link. For this purpose, each network node device involved must enter in its link table the lengths of the paths to the two network node end devices (i.e. to the originating network node device 1 and the destination network node device 6) during the original setting-up of the data link. In the case of a break in the data link, the network node devices affected in each case then compare the two values, additionally taking into consideration that the network node device on the other side of the break area has a path to the respective network node end device which is shorter or longer by the broken path distance than is entered in the link table of the network node device affected in each case. If the two distance metrics are equal, the responsibility for the reconnection can then be determined in accordance with one of the abovementioned methods.

According to a further alternative, the network node devices enter the responsible side in case of a break in the data link into the respective link table when the (original) data link is first set up.

Moreover, in other alternative exemplary embodiments, a list containing the link identifiers of the data links newly to be set up can be transmitted in addition to the abovementioned "flooding" signals.

According to a further alternative, the return path length $n_{BACK}$ is restricted in the above-mentioned algorithm. When the responsibility for the restoration of the broken data link has been forwarded from the network node device 4 affected to a particular number (e.g. n=2) of network node devices, at the latest, the restoration of the data link is initiated by the corresponding network node device (i.e. even if the abovementioned condition ii) has not been fulfilled).

As an alternative, the return path length can be exclusively taken into consideration as criterion for the responsibility of a certain network node device for restoring the data link, instead of the above-mentioned condition ii), i.e. the distance metric. For example, the network node device to which a certain return path length (e.g. n=2, n=0, etc.) has been allocated can be responsible for the reconnection.

According to a further alternative exemplary embodiment, the network node device receiving a (connection release) signaling signal (N_RELEASE_RECONN) decides with the aid of a Bernoulli experiment (which can be performed, for example, by the corresponding control device by using a pseudo-random number generator) whether it is responsible for the reconnection or whether the responsibility is to be forwarded to the next network node device by means of a further (connection release) signaling signal (N_RELEASE_RECONN).

The probabilities used in the Bernoulli experiment can be based, for example, on the number of links connected to the respective network node device and/or on the distance (metric) of the network node device from the originating network node device and/or on the distance (metric) of the network node device from the destination network node device and/or on the instantaneous capacity utilization of the links connected to the respective network node device, etc.

As an alternative, if the standby data link is initially to be conducted along the original path, the network node device responsible for the data link restoration can instruct the next network node device initially to continue using the corresponding segment of the original path (e.g. the segment between network node device 2 and network node device 3). In this case, a modified signal, e.g. a RECONNECT signal, is sent to the network node device 3 from the network node device 2 instead of the (connection setup request) signaling signal S41, shown in FIG. 7 and sent from the network node device 2 to the network node device 3.

In further alternative exemplary embodiments, a "standby" data link conducted via another path is set up in parallel in addition to the above-mentioned "working" data link conducted via the path A-B-C-D-E-F in advance, i.e. with a "working" data link. When disturbances (or excessive disturbances) occur on the "working" data link, the data transmission is then rapidly switched from the "working" data link to the "standby" data link (protection switching).

It holds true for all exemplary embodiments that the respective signaling signals can be transmitted in each case in an unprotected manner or alternatively in a protected manner.

The invention claimed is:

1. An optical communication network in which optical signals are exchanged via a first data link between a first network node device and a second network node device with interposition of a number of further interconnected network node devices, characterized in that, after a disturbance on the first data link, a third network node device sends a signaling signal to a fourth network node device connected to the third network node device, which signaling signal contains a parameter determined by the third network node device on the basis of which it is determined whether the fourth network node device is responsible for setting up a second data link which acts at least partially as a standby for the first data link or not, and wherein the fourth network node device is responsible for setting up the second data link if the distance between the fourth and the second network node devices is not less than the distance, adapted by the distance between the fourth and third network node devices, between the third and second network node devices.

2. The optical communication network as claimed in claim 1, in which the parameter contains information with respect to the distance between the third network node device and the second network node device.

3. The optical communication network as claimed in claim 1, in which the distance between the fourth network node device and the second network node device is additionally taken into consideration in the determination as to whether the fourth network node device is responsible for setting up the second data link or not.

4. The optical communication network as claimed in claim 1, in which one of the network node devices which is located on the path, used by the first data link, from the disturbance location in the direction of the first network node device which has set up the first data link, is responsible for setting up the second data link.

5. The optical communication network as claimed in claim 1, in which one of the network node devices which is located on the path, used by the first data link, from the disturbance location in the direction of the second network node device of the first data link, is responsible for setting up the second data link.

6. The optical communication network as claimed in claim 1, in which the parameter determined by the third network node device or a further parameter transmitted to the fourth network node device contains information on whether the third network node device has received a further signaling signal, corresponding to the signaling signal, from a further network node device connected to the third network node device.

7. The optical communication network as claimed in claim 6, in which the parameter or the further parameter contains information on which of the number of further interconnected network node devices have sent to corresponding network node devices the further signaling signal corresponding to the signaling signal, the number of further network node devices being interconnected directly or indirectly to the third network node device.

8. The optical communication network as claimed in claim 7, in which the fourth network node device is responsible for setting up the second data link if the number corresponds to a predetermined number.

9. The optical communication network as claimed in claim 1, in which the second data link extends wholly or partially via a different undisturbed path from the first data link.

10. A network node device configured as fourth network node device in an optical communication network as claimed in claim 1.

11. The network node device configured as third network node device in an optical communication network as claimed in claim 1.

12. An optical information transmission method in which optical signals are exchanged via a first data link between a first network node device and a second network node device with interposition of a number of further interconnected network node devices, characterized in that, after a disturbance on the first data link, a third network node device sends a signaling signal to a fourth network node device connected to the third network node device, which signaling signal contains a parameter determined by the third network node device on the basis of which it is determined whether the fourth network node device is responsible for setting up a second data link which acts at least partially as a standby for the first data link or not, and wherein the fourth network node device is responsible for setting up the second data link if the distance between the fourth and the second network node device is not less than the distance, adapted by the distance between the fourth and third network node devices, between the third and second network node devices.

* * * * *